July 1, 1958    L. P. SIMPSON    2,841,035
GRIP-SPRING FOR VISE-HANDLES AND THE LIKE
Filed May 13, 1955

INVENTOR.
LEROY P. SIMPSON
BY
R. W. Hodgson
AGENT

United States Patent Office 2,841,035
Patented July 1, 1958

2,841,035

GRIP-SPRING FOR VISE-HANDLES AND THE LIKE

Leroy P. Simpson, Los Angeles, Calif.

Application May 13, 1955, Serial No. 508,070

6 Claims. (Cl. 74—545)

Generally speaking, the present invention relates to the spring-clip art and, more particularly, pertains to a grip-spring cooperable with a rotatable shaft and with a handle bar intersecting said shaft and slidably held thereby—an arrangement found in handles of many vises, clamps, lathes, et al.—to allow the immobilization of said handle bar in a selected position relative to said shaft.

Many of the tools and machines used in machine shops, wood-working shops, and the like, have adjustments requiring the manual rotation of a shaft—e. g., the screw which tightens the jaws of a vise or clamp, the vertical control of a drill press, and various adjustments on lathes and milling machines—said manual rotation requiring a small mechanical advantage during initial stages, and a large mechanical advantage during final stages. To provide this mechanical advantage, the rotatable shaft is often provided with an aperture through which a handle bar (having stops at its ends) can slide. When the shaft is to be rapidly and easily spun, it is convenient to have this handle symmetrically positioned with respect to the shaft; during final tightening or adjustment, the handle bar is pulled to one side or the other to provide a long lever-arm. Also, to keep the handle bar from colliding with the work-object, a tool, or the user's hands, it is often desirable to place the handle bar in some particular positional relationship to the shaft. Since, for convenience and speed, the handle bar usually slides rather loosely in the shaft aperture, it is necessary to provide means for retaining it in the position chosen.

Applicant is aware that various devices have been developed in the past to perform this handle bar-locking function; however, all such devices, known to me, have suffered from numerous disadvantages. Most of these prior devices have been improvised shims, placed in the shaft aperture; they may fall out, be ineffective in preventing handle bar movement, or jam the handle bar. Other prior devices have been permanent modifications of the shaft-and-handle bar (or "handle") assembly—these are of considerable expense over the original type of handle, and require time-consuming adjustments when the handle bar is to be positionally retained or released; also, of course, they cannot be used with an existing handle of the simple shaft-and-bar type unless one goes to considerable expense and trouble. Thus the effective devices have been inconvenient and expensive; the inexpensive and (slightly more) convenient devices have been ineffective.

Generically speaking, the grip-spring of the present invention comprises two hook means, each having a first end and a second, free, end—a first of said hook means being grippingly engageable with a handle bar (of a handle of the type referred to hereinabove), at one side of the shaft (of said handle), the second of said hook means being grippingly engageable with said handle bar at the opposite side of said shaft; and spring wire means connecting said first ends of said hook means and being elastically deformable to bend around said shaft in contact therewith when said hook means are engaged with said handle bar and to bias said hook means against said shaft—the grip-spring usually being placeable in effectively retaining relationship to one of the two elements (handle bar and shaft) of the handle, and in partially encompassing relationship to the other of said two elements; whereby said handle bar may be frictionally retained in a selected relationship to the shaft when the grip-spring is in use.

In one generic form of the present invention, said hook means are elastically deformable to allow their being placed in retaining relation with said handle bar. In a preferred form, the hook means are oriented so that their free ends are oppositely directed, and the spring wire means encompasses about 180 degrees of arc of the shaft; when in use, this form of the grip-spring is almost helical in shape—the angular length of the helix being about two revolutions.

In a preferred general form of the present invention, said spring wire means is shaped as a loop by which said shaft may be completely encompassed, and is elastically deformably openable by one's exertion of manual force on the hook means to permit its being placed around the shaft with said hook means engaging (partially encompassing) said handle bar. The hook means may be elastically deformable, or may be virtually rigid in some forms. In a preferred form, the spring wire means encompasses substantially more than 360 degrees of arc of the shaft, the hook means then beginning (with a reverse curvature) at regions spaced around the shaft from the loop "intersection" point, and having their free ends virtually similarly directed and lying on the other side of the handle bar from said loop. In all the above-mentioned forms, the same grip-spring can be used with handle (shaft and handle bar) assemblies of a wide range of sizes and contours: the larger the shaft (or handle bar), the tighter the engagement of the grip-spring with the handle bar (or shaft), within the limits where engagement with the handle is possible. When the grip-spring is placed on the handle, its frictional engagement holds the handle bar immobile.

From the above description of the basic form and various preferred forms of the present invention, it will be apparent to those skilled in the art that the hereinabove-mentioned disadvantages of the prior art are virtually entirely eliminated and overcome in and through the use of the present invention. For, although the spring-grip of the present invention is extremely simple and inexpensive of construction, it is easy to use on any pre-existing handle and has been found in practice to be extremely effective in immobilizing the handle bar of such a handle with respect to the shaft, permitting the retention of said handle bar in any selected, convenient, position relative to the shaft, but also permitting a change of said position, without removing the grip-spring, by exerting sufficient (intentional) manual force on the handle bar to overcome the friction of the grip-spring. That is, while the handle bar is held against forces due to its own weight, normal centrifugal forces, or accident, a sustained force thereon will permit its movement through the aperture in the shaft to adjust its position when desired.

With the above points in mind, it is an object of the present invention to provide a grip-spring, placeable on a handle consisting of a shaft and a handle bar in slidable intersecting relationship with said shaft, adapted to be retained on said handle and to frictionally engage said handle bar to retain it in a selected position relative to said shaft.

It is also an object of the present invention to provide a grip-spring, as characterized in the preceding object, which can be used with handles of a wide range of sizes and configurations, and which is of simple and inexpensive construction.

Other and allied objects will occur to those skilled in the art after a careful study of the present specification, the accompanying illustrations, and the appended claims.

To facilitate understanding, reference will be made to the hereinbelow-described drawings, in which.

Figure 4:
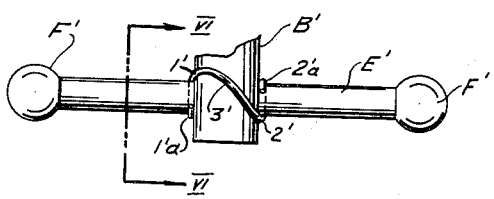
Fig. 4 is a plan view of a second preferred embodiment of the grip-spring in use on a handle assembly which might be used with a C-clamp, a machine adjustment, or other shop device—the handle-bar being in the position appropriate for rapidly spinning the handle.
Figure 5:
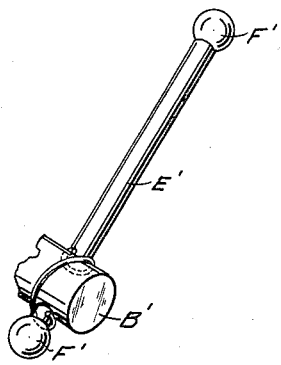
Figure 6:
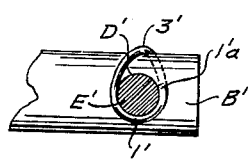

Fig. 5 shows the grip-spring and handle of Fig. 4 in perspective, the handle-bar having been moved to an extreme position relative to the shaft so as to have a long lever-arm and high mechanical advantage, for final adjustment of the handle (or to keep the handle bar out of one's way)—the grip-spring is holding the handle bar from slipping through the shaft under the force of its own weight; and Fig. 6 shows the device of Fig. 4 as it appears, in elevation, from the position indicated by the line and arrows VI—VI of Fig. 4.

Figure 1:
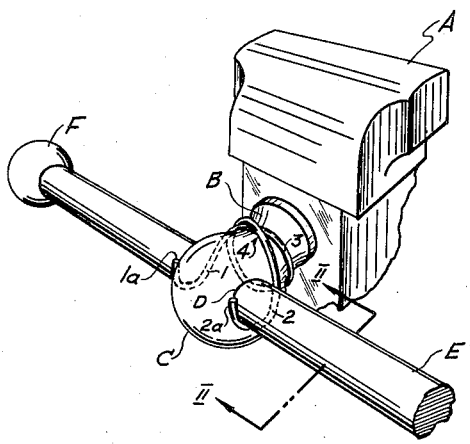
Fig. 1 is a perspective view of a preferred embodiment of the grip-spring of the present invention in use on the handle of a vise, certain parts invisible from this vantage being shown in dashed lines.
Figure 2:
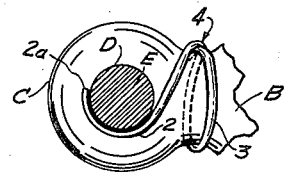
Fig. 2 shows an elevational view of the grip-spring of Fig. 1, as it appears from the position indicated by the line and arrows II—II of Fig. 1 (a section through the handle bar)
Figure 3:
Fig. 3 is a perspective view of the device of Fig. 1 as it appears when not in use, i. e., removed from the handle.

Parts of the embodiment of Figs. 4–6 which are similar to parts of the embodiment of Figs. 1–3 are numbered similarly, but with primed reference numerals. It should be noted that the handles shown in the drawings are not part of the present invention, are not claimed, and are illustrated only to make clear the use of the present invention therewith.

The spring-clip of the present invention, generally speaking, includes two hook means; in the form of Figs. 1–3, the hook means are hooks 1 and 2, having free (second) ends at 1a and 2a respectively. The illustrated hooks are spring-wire, tempered to be elastically deformable, but rigid hooks should have the same general appearance. Also, generally speaking, the present invention includes spring-wire means connecting the first end of said hook means; in the form of Figs. 1–3, the spring wire means is a spring-wire loop, indicated at 3, having its "intersection" point at 4 and continuing into the hooks 1 and 2—the grip-spring thus being of one-piece construction. In Fig. 1, the grip-spring is shown in use with a vise; a portion of a jaw of the vise is indicated at A, the shaft of the tightening screw at B, and the enlarged end of this shaft at C. Through an intersecting aperture D in the shaft-end passes a cylindrical handle bar E having end-stops as indicated at F (the other end, shown broken off for convenience, would also have an end-stop F). To use the grip-spring—which when not in use appears as in Fig. 3—one manually opens the loop by exerting force on the hooks 1 and 2, slips the loop around shaft B, and pushes the hooks under handle bar E, so that when manually released the hooks are biased against the handle bar in biasing frictional engagement therewith, as shown in Figs. 1 and 2. Then the handle bar can be manually longitudinally moved through aperture D and the hooks to a chosen position, where it will be retained under ordinary accidental forces, by the frictional force of the hooks and shaft-aperture on the handle bar. Note that past the "intersection" point 4, the spring wire 3 encompasses about 180 degrees of arc of the shaft more than the loop, reversing curvature to form the hooks 1 and 2, whose free ends 1a and 2a are virtually similarly directed toward the side of the shaft on which point 4 is located; this construction allows the shaft and handle bar to be gripped quite tightly.

In Figs. 4–6, a form of the grip-spring is shown which is well adapted for use with small, light handle assemblies; the handle shown in these figures might be used on a C-clamp, for instance, and has a shaft B' in whose intersecting aperture D' holds a handle E' with end-stops F'. However, it should be noted that the grip-spring of these figures can be used on a handle shaped like that of Figs. 1 and 2; and conversely, the grip-spring of Figs. 1–3 can be used on a handle like that of Figs. 4–6—assuming that the handle sizes are comparable. The grip-spring of Figs. 4–6 includes elastically deformable hooks 1' and 2', having oppositely directed free ends 1'a and 2'a, and connecting spring wire means 3' encompassing about half of the shaft circumference. The grip-spring is thus of nearly helical form, with angular length nearly two revolutions about the axis of the handle bar. In Fig. 4, the handle bar is in symmetrical position to allow the rapid and easy spinning of the handle; in Fig. 5 the handle bar has been forcibly manually moved with respect to shaft and grip-spring to an extreme position in which one of the end-stops F' is nearly against the shaft—in this position considerable mechanical advantage is available, as for final tightening of a C-clamp—or the handle bar may have been placed in such a position in order that it not obstruct the work. In practice, it has been found that the handle bar can be maintained against the force of its own weight in such a position, even under conditions of vibration, with either of the illustrated grip-springs. It may be noted that under conditions of extreme vibration the rattling of a handle-bar in its aperture may lead to the rotation and resulting loss of adjustment of the shaft: the grip-springs of the present invention will serve to prevent such rattling.

Numerous modifications and variations of the present invention will occur to those skilled in the art after a careful study hereof. All such, properly within the basic scope and/or teachings of the present invention are intended to be included and comprehended herein as fully as if specifically described, illustrated and claimed herein.

For example, the hooks may be broad strips instead of the wires shown, or may be provided with surfaces having a higher coefficient of friction with respect to the handle bar than that of the surfaces shown.

The exact compositions, configurations, relative positionings and cooperative relationships of the various component parts of the present invention are not critical, and may be modified substantially within the basic teachings, spirit and scope of the present invention.

The embodiment of the present invention specifically described, illustrated and claimed herein is exemplary only, and is not intended to limit the scope of the present invention, which is intended to be interpreted in the light of the prior art and the appended claims only, with due consideration for the doctrine of equivalents.

I claim:

1. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved and elastically openingly deformable to define a closingly biased curved portion forcibly contactingly curvedly extending at least partially around said rotatable shaft and at least partially around said longitudinal axis thereof when each of said two hook means is engaged with said handle bar on opposite sides of said shaft, said closingly biased curved portion biasing each of two hook means against opposite sides of said shaft; whereby said handle bar may be frictionally retained in a selected relationship to the shaft.

2. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved and elastically openingly deformable to define a closingly biased curved portion forcibly contactingly curvedly extending at least partially around said rotatable shaft and at least partially around said longitudinal axis thereof when each of said two hook means is engaged with said handle bar on opposite sides of said shaft, said closingly biased curved portion biasing each of two hook means against opposite sides of said shaft, said hook means being elastically openably deformable to allow their being placed in retaining relation with said handle bar; whereby said handle bar may be frictionally retained in a selected relationship to the shaft.

3. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved and elastically openingly deformable to define a closingly biased curved portion forcibly contactingly curvedly extending only partially around said rotatable shaft and only partially around said longitudinal axis thereof when each of said two hook means is engaged with said handle bar on opposite sides of said shaft, said closingly biased curved portion biasing each of said two hook means against opposite sides of said shaft; the orientation of said hook means being such that their free ends are virtually oppositely directed; whereby said handle bar may be frictionally retained in a selected relationship to the shaft.

4. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved and elastically openingly deformable to define a closingly biased curved portion forcibly contactingly curvedly extending only partially around said rotatable shaft and only partially around said longitudinal axis thereof when each of said two hook means is engaged with said handle bar on opposite sides of said shaft, said closingly biased curved portion biasing each of said two hook means against opposite sides of said shaft, said hook means being elastically openably deformable to allow their being placed in retaining relation with said handle bar, the orientation of said hook means being such that their free ends are virtually oppositely directed; whereby said handle bar may be frictionally retained in a selected relationship to the shaft.

5. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved as a single complete loop having crossing end portions connected to said first ends of said two hook means and being elastically deformably openable by the manual exertion of force on each of said two hook means toward each other to permit said closingly biased singly looped portion to be forcibly contactingly engaged substantially completely around said rotatable shaft and completely encircling said longitudinal axis thereof with each of said two hook means being engaged with and at least partially encompassing said handle bar on opposite sides of said shaft, said closingly biased singly looped portion biasing each of said two hook means against opposite sides of said shaft, the orientation of said hook means being such that their free ends are virtually similarly directed, whereby said handle bar may be frictionally retained in a selected relationship to the shaft.

6. A grip-spring, cooperable with a shaft having a longitudinal axis and being rotatable around said longitudinal axis, and with a handle bar slidably intersectingly held by said shaft in an aperture therein substantially perpendicular to said longitudinal axis of said rotatable shaft, to immobilize said handle bar in a selected transverse position relative to said shaft, comprising: two hook means, a first of said hook means being grippingly engageable with said handle bar at one side of said shaft, the second of said hook means being grippingly engageable with said handle bar at the opposite side of said shaft, and each of said hook means having a first end and a second, free, end; and spring wire connecting and biasing means connecting said first ends of said two hook means; said spring wire connecting and biasing means being precurved as a single complete loop having crossing end portions connected to said first ends of said two hook means and being elastically deformably openable by the manual exertion of force on each of said two hook means toward each other to permit said closingly biased singly looped portion to be forcibly contactingly engaged substantially completely around said rotatable shaft and completely encircling said longitudinal axis thereof with each of said two hook means being engaged with and at least partially encompassing said handle bar on opposite sides of said shaft, said closingly biased singly looped portion biasing each of said two hook means against opposite sides of said shaft, said hook means being elastically openably deformable to allow their being placed in retaining relation with said handle bar, the orientation of said hook means being such that their free ends are virtually similarly directed, whereby said handle bar may be frictionally retained in a selected relationship to the shaft.

References Cited in the file of this patent

UNITED STATES PATENTS

| | | |
|---|---|---|
| 76,410 | Darling | Apr. 7, 1868 |
| 2,366,061 | Schwinn | Dec. 26, 1944 |
| 2,517,937 | Stanton | Aug. 8, 1950 |